June 6, 1950  J. JOHNSON  2,510,179
TRACTOR HITCH

Filed Sept. 16, 1949          2 Sheets-Sheet 1

INVENTOR
JACK JOHNSON,

BY McMorrow, Berman & Davidson
ATTORNEYS

June 6, 1950    J. JOHNSON    2,510,179
TRACTOR HITCH
Filed Sept. 16, 1949    2 Sheets-Sheet 2
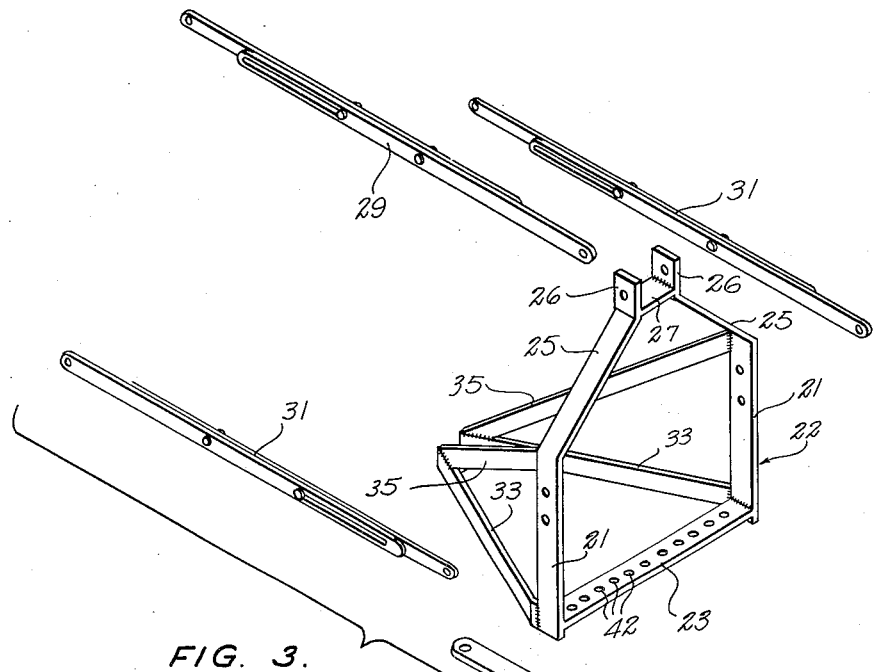
FIG. 3.
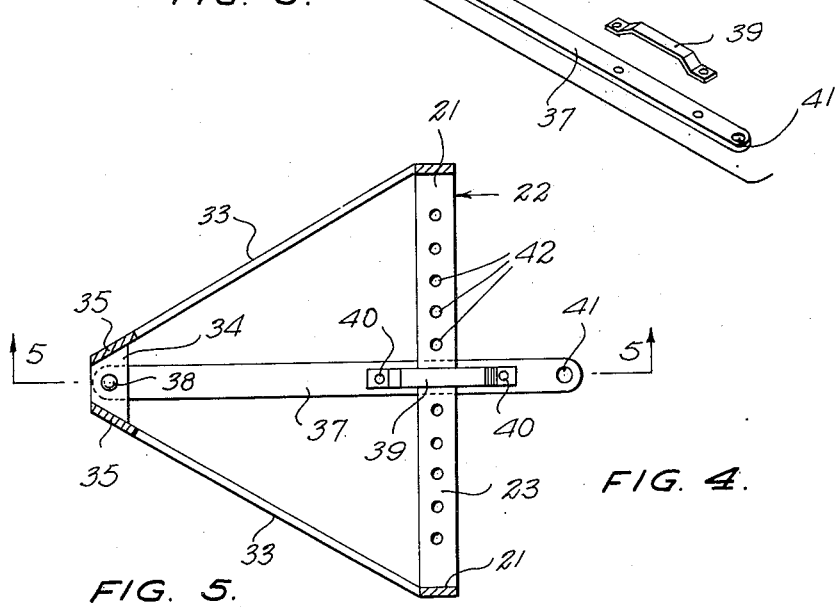
FIG. 4.
FIG. 5.
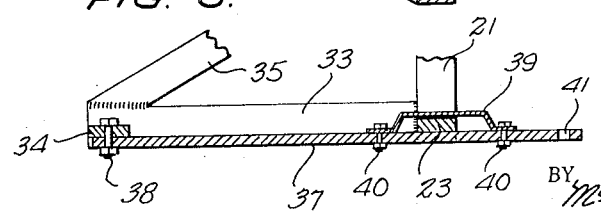
INVENTOR
JACK JOHNSON,
BY McMorrow, Berman & Davidson
ATTORNEYS Patented June 6, 1950

2,510,179

UNITED STATES PATENT OFFICE 2,510,179

TRACTOR HITCH

Jack Johnson, Hereford, Tex.

Application September 16, 1949, Serial No. 116,187

4 Claims. (Cl. 280—33.44)

My invention relates to improvements in tractor hitches of the type commonly used for attaching trailing agricultural implements to tractors.

A primary object of my invention is to provide an improved hitch for a tractor provided with what is commonly referred to as the "Ferguson" system for connecting farm implements with a tractor.

In one form of the Ferguson system a transverse draw bar is supported an appreciable distance behind the tractor rear axle housing. As a result when a farm implement is hitched to the draw bar, much difficulty is encountered in making turns at the end of a field when working in plowed or loose ground, due to the fact that the implement does not closely track behind the tractor. To overcome this difficulty, hitches have been provided for use with the Ferguson system, but these are generally bulky, complicated, and not easily assembled upon or removed from the tractor.

Accordingly, a further object of my invention is to overcome all of the above-mentioned difficulties, by the provision of an improved tractor hitch.

A further object is to provide a tractor hitch, so designed that the free use of the power take-off of the tractor will not be interfered with.

A still further object of my invention is to provide a hitch of the above-mentioned type which is simplified in construction, extremely strong and durable, and relatively inexpensive to manufacture.

Figure 1:
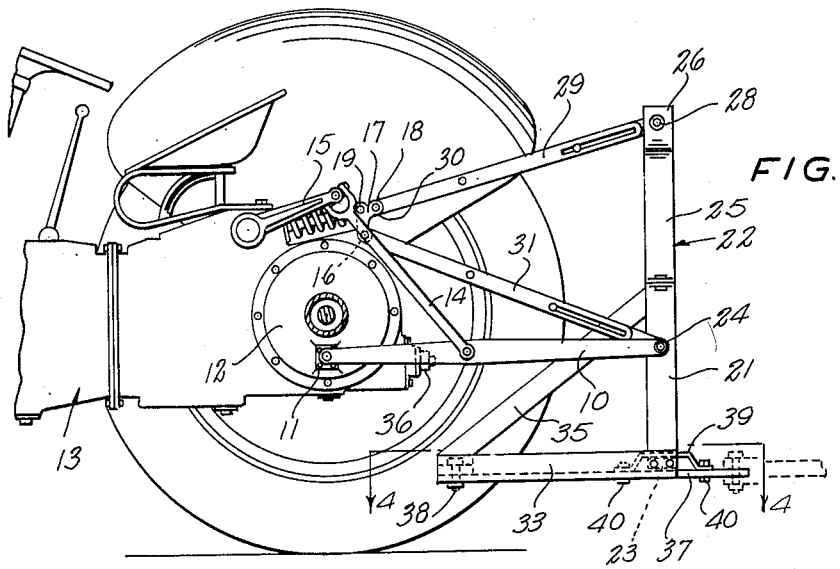
Figure 2:
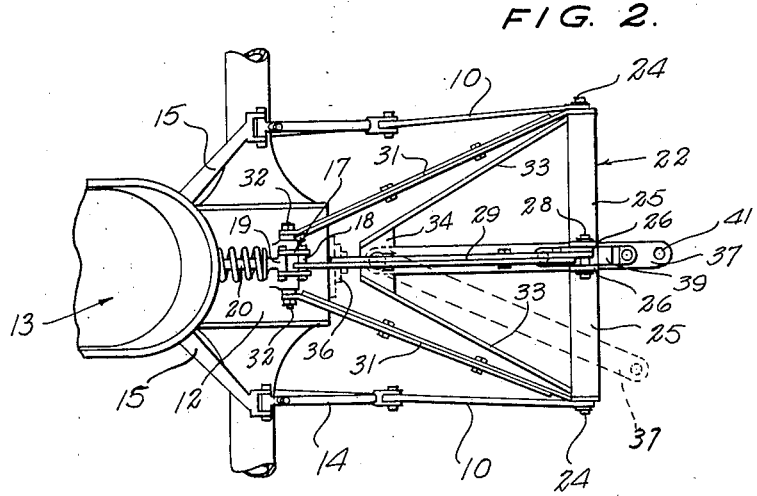

In the accompanying drawings, forming a part of this application, and in which like numerals are employed to designate like parts throughout the same, Figure 1 is a side elevation of a tractor hitch embodying my invention and showing the same mounted upon a tractor, parts broken away, Figure 2 is a plan view of the hitch, Figure 3 is an exploded perspective view of the same, Figure 4 is a horizontal section taken on line 4—4 of Figure 1, and, Figure 5 is a fragmentary vertical section taken on line 5—5 of Figure 4.

In the drawings, where for the purpose of illustration is shown a preferred embodiment of my invention, the numeral 10 designates a pair of laterally spaced opposed horizontal rearwardly diverging bars or arms, pivotally connected at their forward ends 11 to the opposite sides of a differential housing 12 of a tractor 13. Near their longitudinal centers, the arms 10 are pivotally connected with upwardly projecting forwardly inclined lifting arms 14, pivotally connected at their top ends with the rear ends of crank arms 15 of the power lift of the tractor. During the use of the hitch, the crank arms 15 extend rearwardly of the shaft upon which they are mounted and are inclined upwardly slightly from the horizontal. The crank arms 15 and lift arms 14 constitute fixed frame members or supports, during the use of the tractor hitch.

Pivotally secured to the top of the differential housing 12, as shown at 16, and arranged at the transverse center of the tractor is a vertically swinging rocker arm or bell crank 17, having a rearwardly projecting extension 18, and a forwardly projecting extension pivotally connected at 19 to a rod 20, forming a well-known part of the Ferguson system. All of the elements thus far described are conventional, and form parts of the Ferguson system.

Pivotally secured to the rear ends of the horizontal arms 10 and arranged between such arms are vertical upstanding sides 21, of a vertical frame 22, including a bottom transverse horizontal draw bar 23, rigidly secured to the bottom ends of the sides 21. The sides 21 are pivoted to the arms 10 near the vertical center of the frame 22, as at 24, and the sides 21 extend vertically above and below the arms 10, and are bent inwardly above the arms 10 to form upwardly converging transverse extensions 25, in turn bent at their tops to form short vertical upstanding extensions 26, rigidly connected by a plate 27. The extensions 26 are pivotally connected at 28 with a straight longitudinally adjustable brace bar 29, which extends forwardly of the frame 22 and is inclined downwardly toward its forward end for pivotal connection at 30 to the extension 18 of the bell crank 17. The brace bar 29 is arranged at the transverse center of the tractor and extends longitudinally of the center line of the tractor. A pair of diagonal brace bars 31, which are also longitudinally adjustable, are pivotally connected at their rear ends, at 24, between the sides 21 and arms 10, as shown. The brace bars 31 extends forwardly of the frame 22 and are inclined upwardly and converge toward their forward ends, where they are pivotally connected at 32 to fixed lugs secured to the top of the differential housing 12, and arranged laterally outwardly of the bell crank 17.

Arranged at an elevation below the arms 10, and rigidly secured to the lower ends of sides 21 are horizontal forwardly extending converging beams or bars 33, rigidly connected at their forward ends by a web or plate, 34. Forwardly converging inclined diagonal braces 35 are provided and have their rear ends rigidly secured to the tops of sides 21, and their forward ends rigidly secured to the forward ends of the beams 33, as shown. The forward ends of the beams 33 and the plate 34 are arranged at the transverse center of the tractor and directly below the conventional power take-off 36 thereof.

A horizontally swingable tongue or hitch bar 37 is pivotally connected at its forward end to the lower side of the plate 34 by a bolt 38 or the like, and this hitch bar extends rearwardly of and beneath the draw bar 23 and is slidably connected with the draw bar by a longitudinal strap or slide bracket 39, rigidly secured to the hitch bar 37, forwardly and rearwardly of the draw bar by bolts 40. The rear end of the tongue or hitch bar 37 has an opening 41 to facilitate the connection of the tongue to the particular farm implement to be pulled behind the tractor, not shown, such as a disc harrow. The tongue 37 is freely swingable horizontally between the beams 33 and for substantially the entire transverse length of the draw bar 23. The draw bar may be provided with a plurality of longitudinally spaced openings 42, which may receive bolts or pins, upon both sides of the tongue 37, for maintaining the tongue in a selected angular position, if desired.

It is seen, therefore, that the hitch bar or tongue 37 is pivotally supported for horizontal swinging movement at a position adjacent the rear side of the axle housing of the tractor and forwardly of the draw bar 23. By virtue of this pivotal support of the tongue, any farm implement connected therewith is capable of a proper tracking with the tractor, when sharp turns are to be negotiated.

It will be observed that no frame members or obstructions are located where they would interfere with the free use of the power take-off 36, and the wide frame 22 is open, at the rear of the power take-off, the draw bar 23 being well below the same.

The hitch is quite simple in construction and easy to apply to a tractor.

It is to be understood that the form of my invention, herewith shown and described, is to be taken as a preferred example of the same, and that various changes in shape, size and arrangement of parts may be resorted to, without departing from the spirit of my invention or the scope of the subjoined claims.

Having thus described my invention, I claim:

1. A hitch for a tractor having a differential housing and vertically swingable power lift crank arms arranged above the differential housing and laterally outwardly of the same, said hitch comprising a pair of laterally spaced rearwardly extending generally horizontal arms pivotally connected at their forward ends to the sides of the differential housing, upwardly extending lift arms connected with the generally horizontal arms near their longitudinal centers and with the crank arms, a vertical frame mounted upon the rear ends of the generally horizontal arms and extending above and below the same, a longitudinal brace connecting the top of the frame and differential housing, and disposed substantially at the transverse center of the frame, diagonal braces connecting the sides of the frame and differential housing and arranged below the longitudinal brace, forwardly extending substantially horizontal beams secured to the bottom of the frame and projecting forwardly thereof below the generally horizontal arms, a substantially horizontal transverse draw bar arranged near the bottom of the frame and connecting the sides thereof and disposed substantially at the elevation of said beams, and a horizontally swingable hitch bar pivotally connected at its forward end with the forward ends of the beams and slidably connected near its rear end with the draw bar.

2. A hitch for a tractor having a differential housing and crank arms arranged above the differential housing upon opposite sides of the same, the hitch comprising a pair of laterally spaced opposed rearwardly extending arms pivotally connected near their forward ends to the sides of the differential housing, upwardly extending lift arms connecting said arms near their longitudinal centers with the crank arms, a vertical frame secured to the rear ends of the first-named arms and extending above and below the same, a brace connecting the frame with the differential housing, forwardly extending substantially horizontal converging beams secured to the bottom of the frame, a plate connecting the forward ends of the beams, a substantially horizontal transverse draw bar secured to the bottom of the frame substantially at the elevation of the plate, and a horizontally swingable hitch bar pivotally connected at its forward end to the plate and extending rearwardly of and being slidably connected with the draw bar near its rear end.

3. A hitch for a tractor including a differential housing and crank arms arranged above such housing upon opposite sides of the same, comprising a pair of opposed substantially horizontal rearwardly extending arms having their forward ends secured to the sides of the differential housing, upwardly extending inclined lift arms connected with the horizontal arms near the longitudinal centers thereof and having their upper ends connected with the crank arms, a vertical frame secured to the rear ends of the horizontal arms and including sides extending above and below such arms and converging above the horizontal arms, a plate connecting the upper ends of the sides, a longitudinal brace connected with the upper ends of the sides above the plate and extending longitudinally forwardly of the frame and connected with the differential housing, forwardly extending substantially horizontal converging beams secured to the bottom of the frame and having their forward ends disposed near and below the differential housing, a web connecting the forward ends of the beams, a substantially horizontal transverse draw bar secured to the bottom of the frame at substantially the elevation of the web, and a horizontally swingable hitch bar having its forward end pivotally connected to the web between the beams, and extending rearwardly of and slidably connected with the draw bar.

4. A hitch for a tractor including a differential housing and crank arms arranged above the housing upon opposite sides thereof, comprising a pair of opposed substantially horizontal rearwardly extending diverging arms secured at their forward ends to the sides of the differential housing, upwardly extending forwardly inclined lift arms having their lower ends connected with the horizontal arms near the longitudinal centers thereof and their upper ends connected with the ends of the crank arms, a vertical frame including vertical sides secured to the rear ends of the horizontal arms, the sides extending vertically above and below the horizontal arms, the sides being bent inwardly above the horizontal arms to form converging extensions, a horizontal plate arranged between the converging extensions and connecting the same, short upstanding extensions secured to the converging extensions and projecting above the plate, a longitudinal brace arranged between and connected with the short upstanding extensions and extending longitudinally forwardly thereof and connected at its forward end with the differential housing, diagonal braces arranged below the longitudinal brace and connected at their rear ends with the sides of the frame adjacent to the horizontal arms and connected at their forward ends with the top of the differential housing, forwardly extending substantially horizontal converging beams secured to the bottom of the frame and having their forward ends disposed near and below the bottom of the differential housing, a horizontal web connecting the forward ends of the beams, a substantially horizontal transverse draw bar secured to the bottom of the frame and extending between the sides thereof at substantially the elevation of the web, a horizontally swingable hitch bar having its forward end pivotally connected with the web between the beams and extending rearwardly of the draw bar and beneath the same, and a strap secured to the hitch bar and engaging over the draw bar for slidably connecting the hitch bar and draw bar.

JACK JOHNSON.

REFERENCES CITED

The following references are of record in the file of this patent:

UNITED STATES PATENTS

| Number | Name | Date |
|---|---|---|
| 2,321,516 | Robertson | June 8, 1943 |
| 2,392,903 | Currie | Jan. 15, 1946 |